United States Patent Office 3,309,378
Patented Mar. 14, 1967

3,309,378
NOVEL NITROPYRRYLHETEROCYCLIC DERIVATIVES
George L. Dunn, Levittown, N.J., assignor to Smith Kline & French Laboratories, Philadelphia, Pa., a corporation of Pennsylvania
No Drawing. Filed Nov. 22, 1963, Ser. No. 325,788
7 Claims. (Cl. 260—304)

This invention relates to new nitropyrrylheterocyclic compounds having utility as antibacterial or antifungal agents. These new compounds are particularly effective against protozoa e.g. *Trichomonas foetus* or *Trichomonas vaginalis* and are also active anthelminthics particularly against pinworm infestations.

The compounds of this invention are illustrated by the following structural formula:

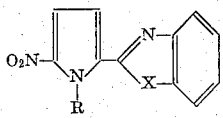

in which R is hydrogen, lower alkyl or hydroxy lower alkylene and X is —O—, —S— or —NH—.

The compounds of this invention are prepared by condensing appropriate nitropyrrylcarboxaldehyde (prepared as in Bull. Soc. Chim. France, #3, 488–491, 1963) with an appropriate o-phenylenediamine, o-aminophenol or o-aminothiophenol in a suitable solvent in which the reactants are substantially soluble such as a lower alcohol or acetic acid to form the novel Schiff base which is also an aspect of this invention. The Schiff base intermediates may be optionally isolated or directly cyclized in the presence of lead tetracetate usually in glacial acetic acid with slight warming to give the desired nitropyrrylheterocycle.

While the compounds of this invention are usually used in their free base form, one on occasion may form a non-toxic salt with a strong pharmaceutically acceptable acid such as hydrochloric, hydrobromic, sulfuric, etc. acid. These salts are included in this invention.

Certain modifications of this invention will be obvious to those skilled in the art such as standard alternate substituents on the pyrrole nitrogen atom, inert substituents elsewhere on the nucleus of the compounds such as halo, lower alkoxy, lower alkyl, trifluoromethyl, etc. groups or acyl derivatives of the N-hydroxyalkyl congeners described herein. These modifications are within the ambit of this invention. The terms lower alkyl, lower alkylene or lower alkoxy are used herein to denote a maximum of 8 carbon atoms. Little additional advantage is found however beyond the methyl, ethyl, propyl, ethylene, propylene or isopropylene moieties.

The following examples are designated to teach one skilled in the art to practice this invention but are not designed as limiting this invention.

Example 1

To a cold (—5° C.) suspension of o-phenylenediamine (7.7 g., 0.072 mole) in 90 ml. of alcohol is added a warm (60° C.) solution of 5-nitro-2-pyrrolecarboxaldehyde (10.0 g., 0.072 mole) in 70 ml. of alcohol causing the temperature to rise to 30° C. The deep red solution which results is cooled to 10° C., then allowed to come to room temperature over 1 hour. The thick suspension which forms is cooled and filtered to yield the maroon Schiff base, M.P. 154–157° C.

A stirred suspension of the Schiff base (11.5 g., 0.05 mole) in 100 ml. of glacial acetic acid is treated in one portion with a warm (60–70° C.) solution of lead tetracetate (22.1 g., 0.05 mole) in 200 ml. of glacial acetic acid. After an initial temperature rise to 70° C., the dark solution is cooled to 50° C. and stirred for 15 minutes. It is then cooled to 17° C., filtered and the collected solid washed with ether to give 7.5 g. of crude orange-brown benzimidazole. Decolorization with activated carbon and recrystallization from acetone-toluene gives yellow-orange 2-(5'-nitro-2'-pyrryl)-benzimidazole, M.P. 265–266.5° C.

Example 2

To a mixture of o-aminophenol (2.18 g., 0.02 mole) and 5-nitro-2-pyrrolecarboxaldehyde (2.8 g., 0.02 mole) in 33 ml. of glacial acetic acid is added a warm solution of lead tetracetate (8.8 g., 0.2 mole) in 80 ml. of glacial acetic acid. The resulting dark solution is warmed at 50° C. for 15 minutes then poured into 700 ml. of water. The brown solid (4.5 g.) obtained upon filtration is chromatographed on 150 g. of neutral alumina (Woelm, activity grade I) in 4:1 methylene chloride-ethyl acetate to yield a fast-moving yellow solid, which after recrystallization from toluene gives lemon yellow 2-(5'-nitro-2'-pyrryl)-benzoxazole, M.P. 161–161.5° C.

Example 3

To a mixture of o-aminothiophenol (2.5 g., 0.02 mole) and 5-nitro-2-pyrrolecarboxaldehyde (2.8 g., 0.02 mole) and 33 ml. of glacial acetic acid is added a warm solution of lead tetracetate (8.8 g., 0.02 mole) in 80 ml. of glacial acetic acid. The resulting dark solution is allowed to stir at 50° C. for 15 minutes then cooled to 20° C. and the precipitated solid collected. The air-dried, dark material (2.0 g.) is chromatographed on 60 g. of neutral alumina (Woelm, activity grade I) in 9:1 methylene chloride-ethyl acetate to yield 1.5 g. of yellow product. Recrystallization from toluene gives yellow 2-(5'-nitro-2'-pyrryl)-benzthiazole, M.P. 160–161° C.

Example 4

To a cold (5° C.) suspension of o-phenylenediamine (1.4 g., 0.013 mole) in 16 ml. of alcohol is added a solution of N-methyl-5-nitro-2-pyrrolecarboxaldehyde (2.0 g., 0.013 mole) in 13 ml. alcohol. After the initial temperature rise to 20° C. the solution is allowed to stir 1.5 hours at room temperature. The thick suspension is filtered, the collected red solid washed with a little alcohol then dried to give Schiff base, M.P. 126–134° C.

The Schiff base (2.5 g., 0.01 mole) is suspended in 25 ml. of glacial acetic acid and a solution of lead tetracetate (4.4 g., 0.01 mole) in 45 ml. of glacial acetic acid is added. The dark solution is allowed to stir 15 minutes at 50° C., then cooled to 20° C. and filtered. The collected yellow solid is recrystallized from toluene to give yellow 2-(N'-methyl-5'-nitro-2'-pyrrly)-benzimidazole, M.P. 242–243° C.

Example 5

To a mixture of o-aminophenol (2.18 g., 0.02 mole) and N-methyl-5-nitro-2-pyrrolecarboxaldehyde (3.02 g., 0.02 mole) in 33 ml. of glacial acetic acid is added a warm solution of lead tetracetate (8.8 g., 0.02 mole) in 80 ml. of glacial acetic acid. After an initial temperature rise to 80° C. the solution is allowed to stir at 50° C. for 15 minutes, then cooled to 20° C., diluted with 700 ml. of water and filtered to yield crude brown benzoxazole.

A portion of this material (2.7 g.) is chromatographed on 100 g. of neutral alumina (Woelm, activity grade I) in methylene chloride to yield yellow 2-(N'-methyl-5'-nitro-2'-pyrryl)-benzoxazole, M.P. 184–186° C. Recrystallization from toluene yields greenish-yellow plates, M.P. 186.5–187.5° C.

Example 6

To a mixture of o-aminothiophenol (1.68 g., 0.013 mole) and N - methyl - 5 - nitro-2-pyrrolecarboxaldehyde (2.0 g., 0.013 mole) in 23 ml. of glacial acetic acid is added a warm solution of lead tetracetate (5.8 g., 0.013 mole) in 55 ml. of glacial acetic acid. The dark solution is allowed to stir 15 minutes at 50° C., then cooled to 20° C. and poured into 800 ml. of water. The collected brown solid is chromatographed on 100 g. of neutral alumina (Woelm, activity grade I) in methylene chloride. Recrystallization of the fast-moving yellow fractions from acetone-toluene gives 0.70 of yellow 2-(N'-methyl-5'-nitro-2'-pyrryl)-benzthiazole, M.P. 140–141° C.

*Example 7*

Substituting an equimolar quantity of N-ethyl-5-nitro-2-pyrrolecarboxaldehyde (prepared by substituting ethyl iodide in the method of P. Fournari, Bull. Soc. Chim. France #3, 490, 1963) in Example 4 gives first the Schiff base and then with lead tetracetate in acetic acid 2-(N'-ethyl-5'-nitro-2'-pyrryl)-benzimidazole.

Substituting an equimolar quantity of N-hydroxyethyl- or N-acetoxyethyl-5-nitro-2-pyrrolecarboxaldehyde (prepared using ethylene bromohydrin or 2-bromoethyl acetate in the Fournari process) in Example 4 gives the Schiff base and then 2-(N'-hydroxyethyl-5'-nitro-2'-pyrryl)-benzimidazole.

What is claimed is:
1. A compound of the structure:

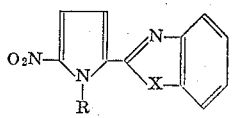

in which R is a member selected from the group consisting of hydrogen, lower alkyl and hydroxy lower alkylene; and X is a member selected from the group consisting of —O—, —S— and —NH—.

2. 2-(N'-methyl-5'-nitro-2'-pyrryl)-benzimidazole.
3. 2-(5'-nitro-2'-pyrryl)-benzimidazole.
4. 2-(N'-methyl-5'-nitro-2'-pyrryl)-benzoxazole.
5. 2-(N'-methyl-5'-nitro-2'-pyrryl)-benzthiazole.
6. 2-(5'-nitro-2'-pyrryl)-benzoxazole.
7. 2'(5'-nitro-2'-pyrryl)-benzthiazole.

References Cited by the Examiner

UNITED STATES PATENTS

| | | | |
|---|---|---|---|
| 2,513,996 | 7/1950 | Haury | 260—240 X |
| 2,830,046 | 4/1958 | Hayes | 260—240 |
| 2,906,752 | 9/1959 | Howard | 260—240 |
| 3,001,992 | 9/1961 | Bellany et al. | 260—240 |
| 3,102,074 | 8/1963 | Brown | 167—53 |
| 3,155,571 | 11/1964 | Sarret et al. | 167—53 |

FOREIGN PATENTS

| | | |
|---|---|---|
| 628,098 | 2/1963 | Belgium. |

OTHER REFERENCES

Chemical Abstracts I, vol. 44, cols. 5372 to 5373 (1950).

De Selms: J. Org. Chem., vol. 27, pages 2163–2165 (1962).

Farcasan: Acad., Rep. Populare Romine, Filiala Cluj, Studii Cercetari Chem., vol. 13 (I), pages 103–7 (1962).

German Auslegeschrift: 1,117,000, May 1962, 2 pp. spec.

Tirouflet et al.: Comptes Rendus, vol. 250, pages 1276 to 1278.

JOHN D. RANDOLPH, *Primary Examiner*.